(12) United States Patent
Muravsky

(10) Patent No.: US 8,395,109 B2
(45) Date of Patent: Mar. 12, 2013

(54) MOTION SENSOR FOR DETECTING BENDING OR PIVOTING

(75) Inventor: Glenn Muravsky, Los Angeles, CA (US)

(73) Assignee: The Jim Henson Company, Inc., Hollywood, CA (US)

(*) Notice: Subject to any disclaimer, the term of this patent is extended or adjusted under 35 U.S.C. 154(b) by 305 days.

(21) Appl. No.: 12/787,335

(22) Filed: May 25, 2010

(65) Prior Publication Data

US 2011/0292049 A1 Dec. 1, 2011

(51) Int. Cl.
*G01D 5/34* (2006.01)
(52) U.S. Cl. ................. 250/231.1; 250/227.14
(58) Field of Classification Search .......... 250/221, 250/227.11, 227.12, 227.14; 333/241, 242
See application file for complete search history.

(56) References Cited

U.S. PATENT DOCUMENTS

| | | | |
|---|---|---|---|
| 2,848,695 A * | 8/1958 | Pierce | 333/242 |
| 4,542,291 A | 9/1985 | Zimmerman | |
| 4,922,925 A | 5/1990 | Crandall et al. | |
| 4,937,444 A * | 6/1990 | Zimmerman | 250/231.1 |
| 4,972,074 A | 11/1990 | Wright | |
| 4,988,981 A | 1/1991 | Zimmerman et al. | |
| 5,097,252 A | 3/1992 | Harvill et al. | |
| 5,442,729 A * | 8/1995 | Kramer et al. | 704/271 |
| 6,424,334 B1 | 7/2002 | Zimmerman et al. | |
| 6,612,992 B1 * | 9/2003 | Hossack et al. | 600/467 |
| 7,205,979 B2 | 4/2007 | Zimmerman et al. | |

* cited by examiner

*Primary Examiner* — Thanh Luu
*Assistant Examiner* — Renee Naphas
(74) *Attorney, Agent, or Firm* — David Wright Tremaine LLP; Heather M. Colburn

(57) ABSTRACT

A motion sensor having a coiled member, light emitter, and light detector. The coiled member is bendable in response to lateral forces applied thereto. The coiled member defines an internal open ended channel having a first end opposite a second end. The emitter is adjacent the first end and emits light into the channel. At least a portion of that light travels through the channel toward the second portion. An amount of light reaching the detector is determined at least in part by how much the coiled member is bent. The detector is adjacent the second end and receives light from the channel. The detector is configured to transmit a signal indicating an amount of light received. The signal may be used by a motion capture system to animate a computer generated animation. Multiple motion sensors may be incorporated into a glove and positioned to detect bending of finger joints.

24 Claims, 14 Drawing Sheets

MOTION SENSOR FOR DETECTING BENDING OR PIVOTING

BACKGROUND OF THE INVENTION

1. Field of the Invention

The present invention is directed generally to a motion sensor and more particular to a motion sensor configured to detecting bending or pivoting.

2. Description of the Related Art

Motion sensors configured to detect pivoting or bending typically include potentiometers, mechanical linkages, or fiber optics. Such bend sensors have been incorporated into gloves (often referred to as data gloves) used to detect hand and finger motion. Unfortunately, these sensors each have significant drawbacks when used in data gloves. For example, static electricity can interfere with or even damage a sensor including a potentiometer. Further, side torque applied to a potentiometer by a wearer of the glove can damage the potentiometer. Data gloves including fiber optic based bend sensors are expense compared to other technologies. Further, fiber optic sensors can be delicate and easily damaged. To allow the wear to make a fist, mechanical levers must be appropriately sized and sufficiently curved. Unfortunately, such mechanical linkages are often bulky, cumbersome to operate, and vulnerable to mechanical problems.

Therefore, a need exists for a new bend sensor. A bend sensor not having the aforementioned drawbacks is particularly desirable. A bend sensor configured for inclusion in a data glove is also desirable. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
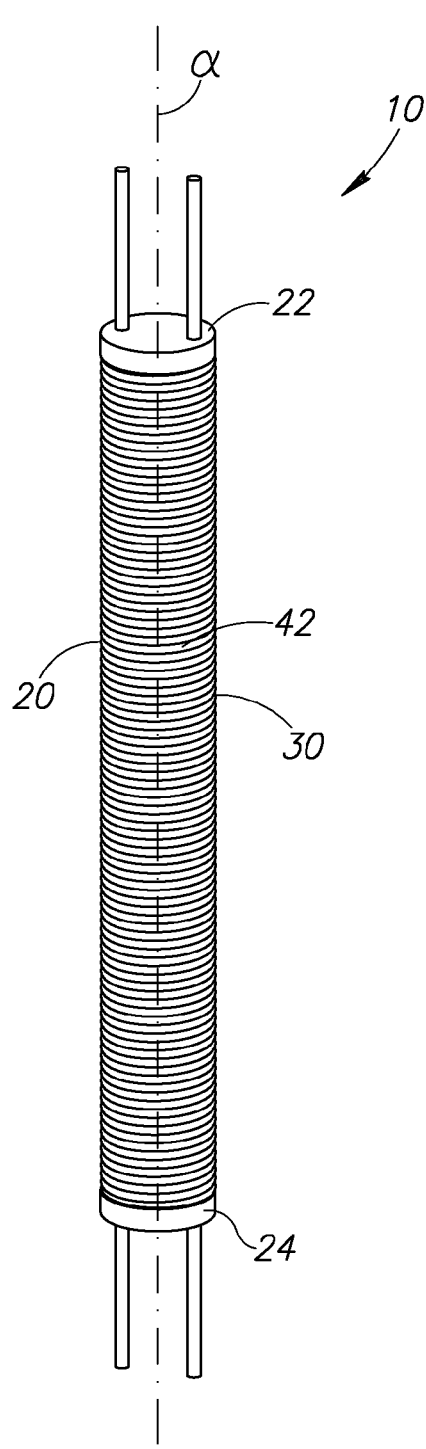
FIG. 1 is perspective view of a first embodiment of a motion sensor.
Figure 2:
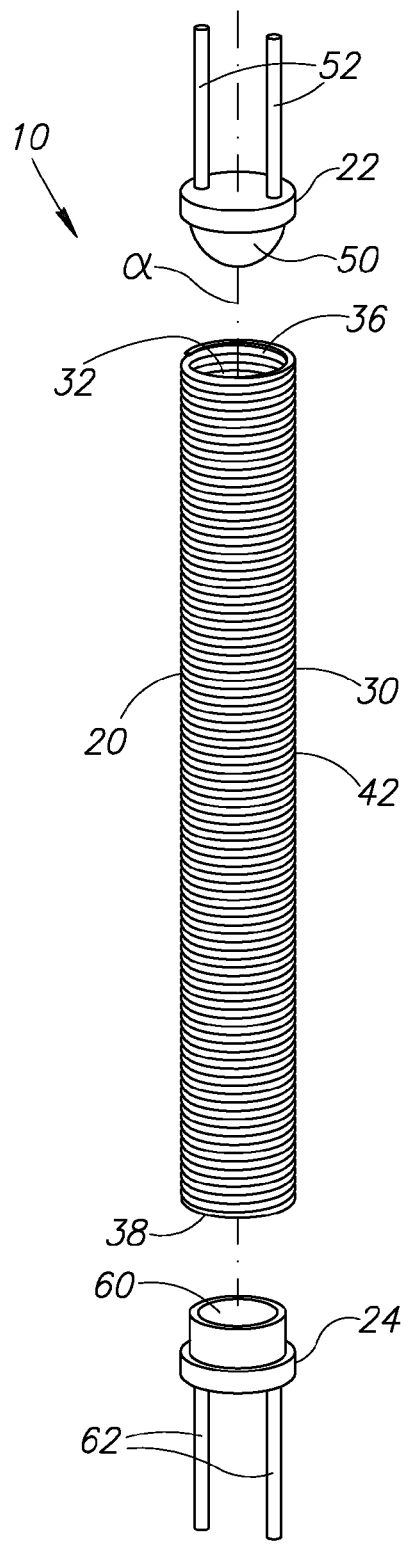
FIG. 2 is an exploded perspective view of the motion sensor of FIG. 1.

FIGS. 1 and 2 illustrate a motion sensor 10 configured to detect motion along a single longitudinal axis "α" of bending. The motion sensor 10 generates an electric signal that may be supplied to a motion capture system and used to animate a computer generated animated character or object.

The sensor 10 includes a coiled member 20, a light emitter 22, and a light detector 24. Referring to FIG. 2, the coiled member 20 has a helically coiled portion 30 defining an open ended channel 32. The channel 32 has a first open end portion 36 opposite a second open end portion 38. The coiled member 20 may be implemented using a conventional coil spring constructed using wire bent to form a single spiral or helix.

Figure 3:
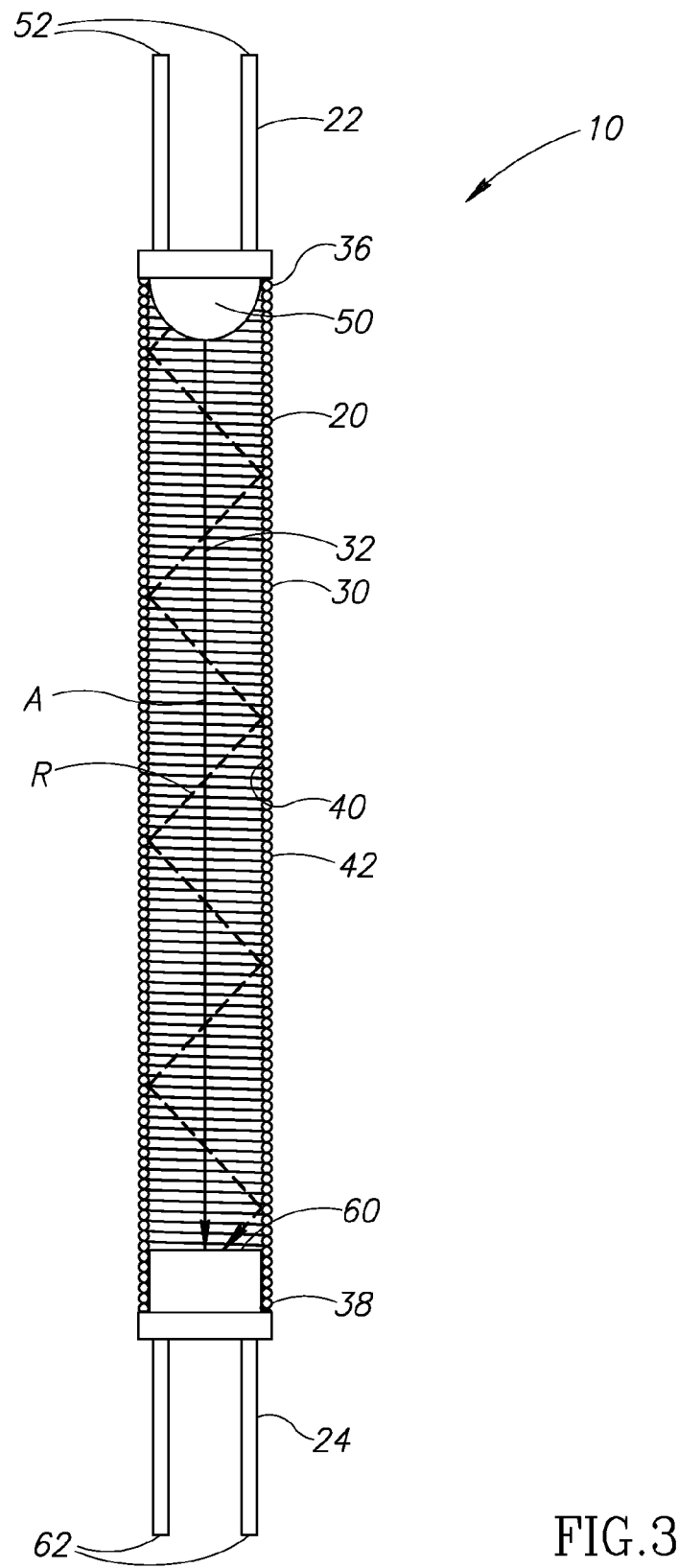
FIG. 3 is a longitudinal cross-sectional side view of the motion sensor of FIG. 1.

Referring to FIG. 3, the helically coiled portion 30 has an inwardly facing portion 40 opposite an outwardly facing portion 42. In the embodiment illustrated, the helically coiled portion 30 has a generally elongated cylindrical shape with a circular cross-sectional shape. Thus, the inwardly facing portion 40 may be other than planar. Specifically, because of the geometry of the helically coiled portion 30, in the embodiment illustrated, the inwardly facing portion 40 may be characterized as being ridged, ribbed, or corrugated. However, in alternate embodiments, the helically coiled portion 30 may be constructed using a flat band or strip of material (not shown) having a generally planar inwardly facing portion (not shown).

The light emitter 22 is positioned adjacent the first open end portion 36 such that at least a portion of the light (illustrated as arrows "A" and "R") emitted by the light emitter 22 enters the first open end portion 36 of the channel 32. The light emitter 22 has a light emitting portion 50 opposite a power receiving portion 52. When power is transmitted to the power receiving portion 52, the light emitting portion 50 is illuminated. In the embodiment illustrated, the light emitting portion 50 is positioned fully inside the first open end portion 36 of the channel 32. The light emitter 22 may be implemented as an infrared light emitting diode ("LED"). By way of another non-limiting example, the light emitter 22 may be implemented as a coherent laser light emitter. Optionally, the light emitter 22 may be configured to be selectively turned on and off (e.g., to strobe). The light emitter 22 is configured to emit light having one or more wavelengths.

The light detector 24 is positioned adjacent the second open end portion 38 to detect light arriving at the second open end portion 38 after having traveled through the channel 32. The light detector 24 has a light receiving portion 60 opposite a signal transmitting portion 62. The light detector 24 is configured to translate an amount of light received by the light receiving portion 60 into a signal transmitted by the signal transmitting portion 62. In the embodiment illustrated, the signal transmitting portion 62 transmits an analog signal indicating an amount of light received by the light receiving portion 60. Thus, the signal may encode an instantaneous total amount of light received by the light receiving portion 60.

In the embodiment illustrated, the light receiving portion 60 is positioned fully inside the second open end portion 38 of the channel 32. By way of a non-limiting example, in embodiments in which the light emitter 22 has been implemented using an infrared LED, the light detector 24 may be implemented using any infrared light sensor known in the art.

In embodiments in which the light emitter 22 has been implemented using the coherent laser light emitter, the light detector 24 may include an optics assembly (not shown) and an image sensor (not shown). The optics assembly may include one or more lenses configured to focus light on the image sensor. The image sensor may be implemented as a charge coupled device ("CCD") image sensor, a complementary metal-oxide-semiconductor ("CMOS") image sensor, and the like.

In embodiments in which the light emitting portion 50 of the light emitter 22 emits light having more than one wavelength, the light receiving portion 60 is configured to detect each of the wavelengths of light separately and the signal transmitting portion 62 is configured to transmit a signal indicating an amount of light having each of the wavelengths detected was received by the light receiving portion 60.

In FIG. 3, the helically coiled portion 30 of the coiled member 20 has not been deflected and therefore, is substantially straight or linear. In this configuration, at least a first portion of the light emitted by the light emitting portion 50 (illustrated as arrow "A") travels through the channel 32 along a linear path of travel and is received by the light receiving portion 60 of the light detector 24. The first portion of light will be referred to as "direct light." A second portion of light emitted by the light emitting portion 50 (illustrated as arrow "R" having a dashed line) travels through the channel 32 to the light receiving portion 60 of the light detector 24 by reflecting off of the inwardly facing portion 40 of the helically coiled portion 30 of the coiled member 20. The second portion of light will be referred to as "reflected light." A total amount of light received by the light receiving portion 60 of the light detector 24 is a sum of the direct light and the reflected light.

Figure 4:
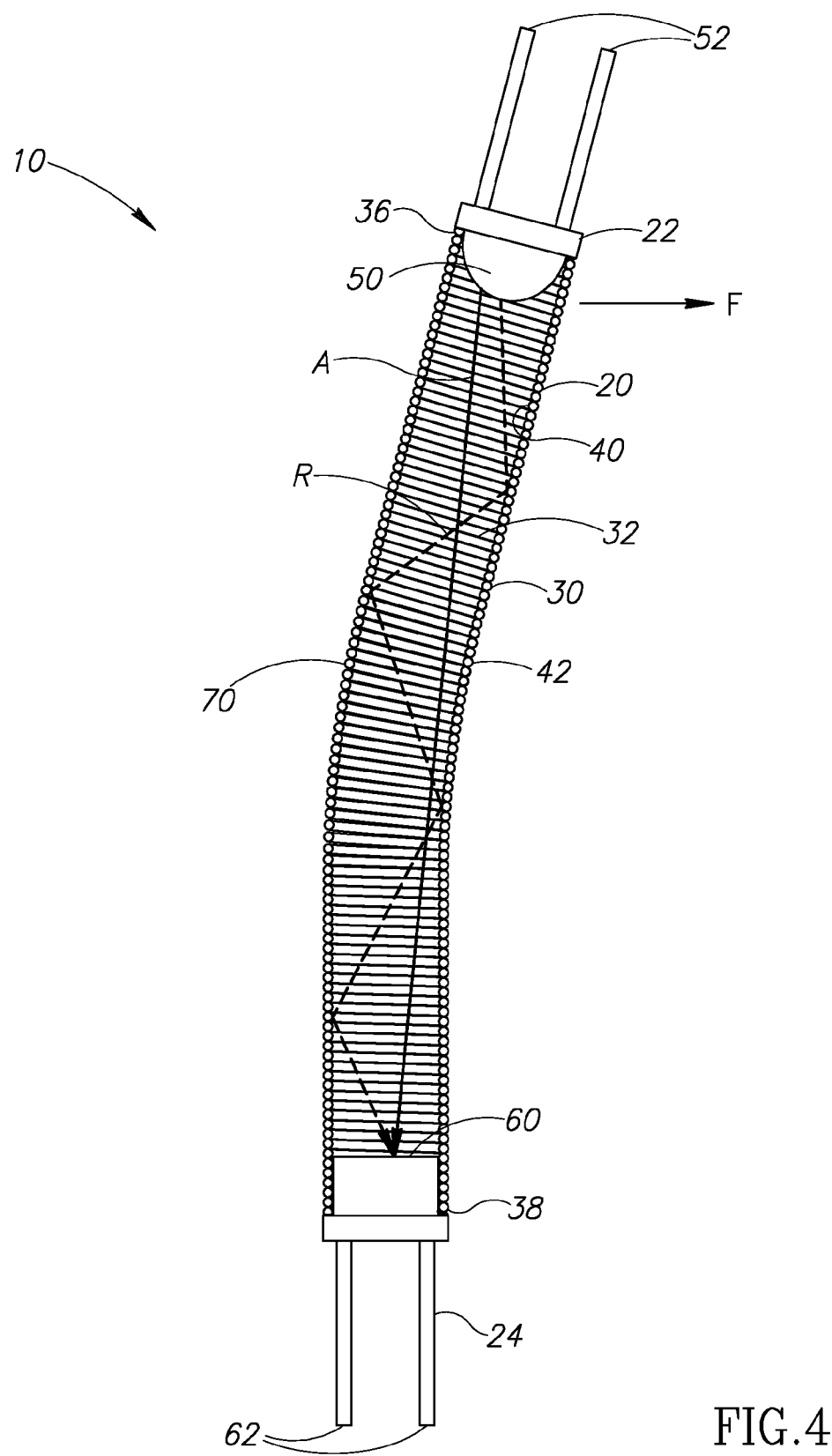
FIG. 4 is a longitudinal cross-sectional side view of the motion sensor of FIG. 1 illustrated with its helically coiled portion deflected slightly.

In FIG. 4, the helically coiled portion 30 of the coiled member 20 has been deflected or bent along the longitudinal axis "α" to form a bent portion 70. The helically coiled portion 30 is configured to bend laterally in response to a laterally applied force "F." Because the bent portion 70 is formed in the helically coiled portion 30, the channel 32 does not collapse and remains open allowing light to pass therethrough. The helically coiled portion 30 has sufficient strength to prevent the channel 32 from collapsing even when the helically coiled portion 30 is bent significantly.

When the helically coiled portion 30 is bent, the amount of direct light received by the light receiving portion 60 of the light detector 24 is smaller than the amount of direct light received by the light receiving portion 60 when (as in FIG. 3) the helically coiled portion 30 has not been deflected. Further, the total amount of light received by the light receiving portion 60 of the light detector 24 is less than the total amount of light received by the light receiving portion 60 of the light detector 24 when (as in FIG. 3) the helically coiled portion 30 has not been bent (deflected).

Figure 5:
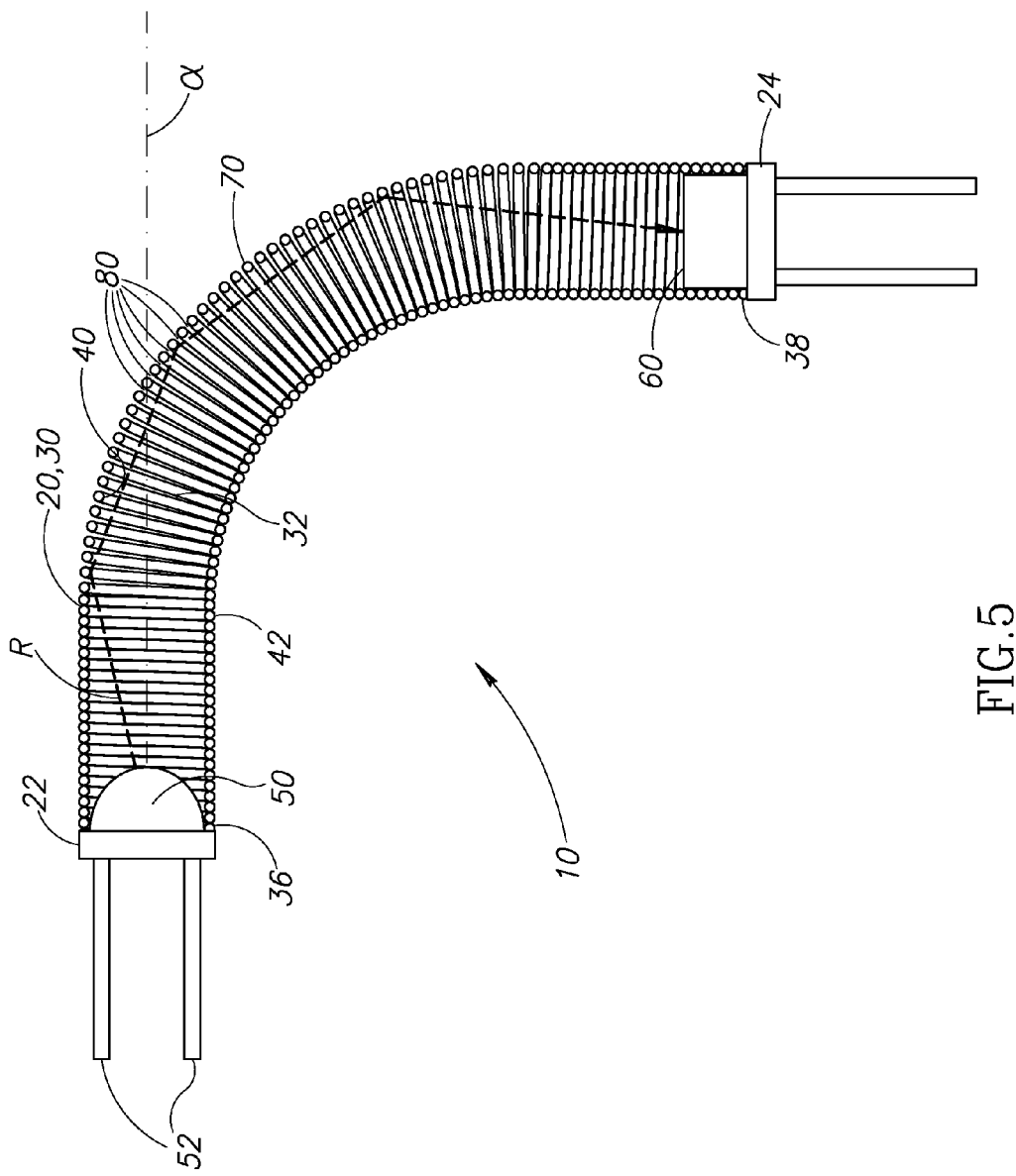
FIG. 5 is a longitudinal cross-sectional side view of the motion sensor of FIG. 1 illustrated with its helically coiled portion deflected about 90°.

In FIG. 5, the helically coiled portion 30 of the coiled member 20 has been deflected or bent along the longitudinal axis "α" by about 90°. Because of the severity of the bend in the bent portion 70 illustrated in FIG. 5, none of the direct light (illustrated as arrow "A" in FIGS. 3 and 4) can travel through the channel 32 to the light receiving portion 60 of the light detector 24 along the linear path of travel. In other words, no direct light reaches the light receiving portion 60 of the light detector 24. Instead, only reflected light (illustrated as arrow "R") reaches the light receiving portion 60 of the light detector 24. Thus, the total amount of light received by the light receiving portion 60 of the light detector 24 includes only the reflected light. Further, the total amount of light received by the light receiving portion 60 of the light detector 24 is less than the total amount of light received by the light receiving portion 60 of the light detector 24 when (as in FIG. 4) the helically coiled portion 30 has been deflected less severely and (as in FIG. 3) the helically coiled portion 30 has not been deflected at all.

Figure 6:
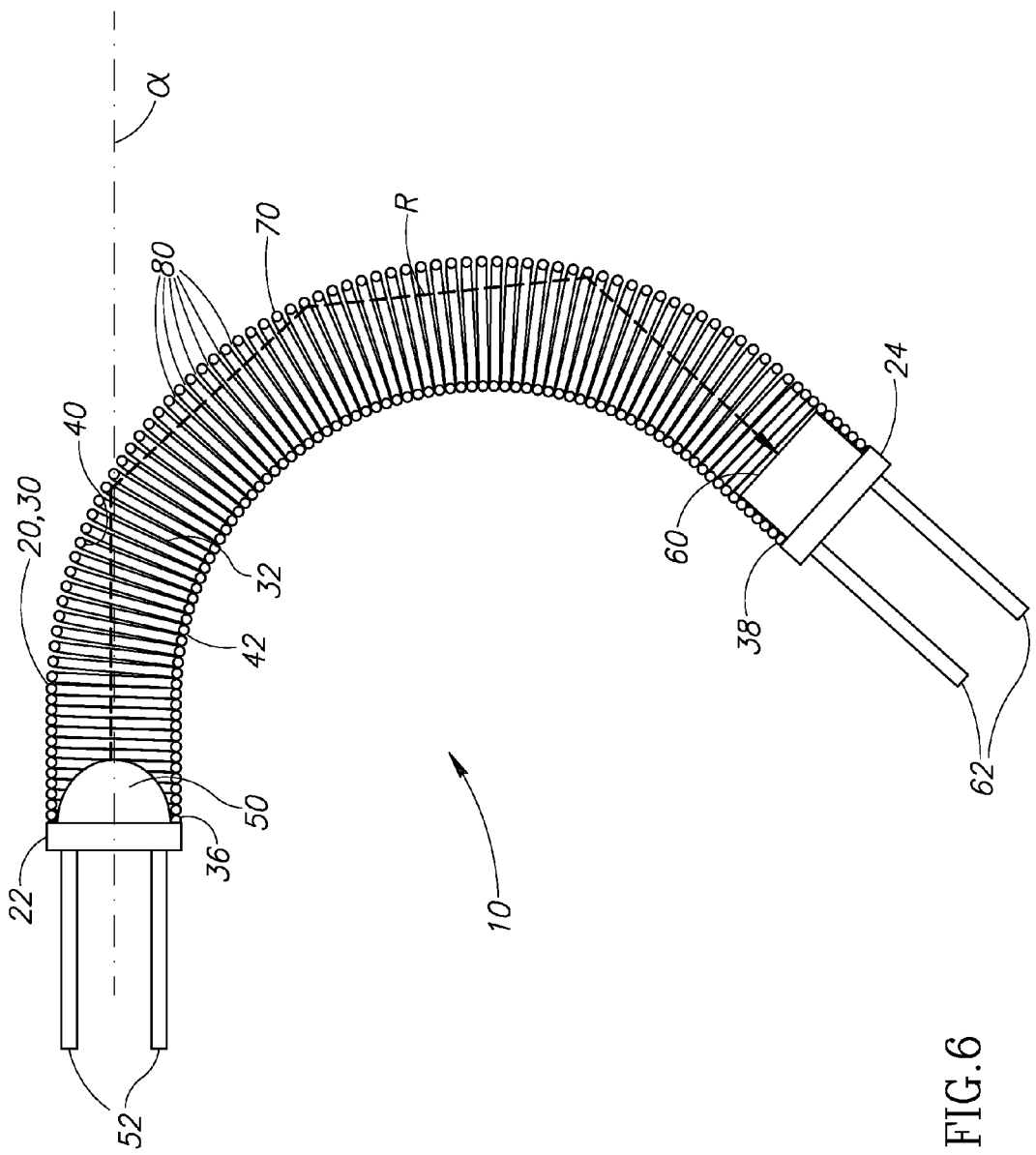
FIG. 6 is a longitudinal cross-sectional side view of the motion sensor of FIG. 1 illustrated with its helically coiled portion deflected more than 90°.

As illustrated in FIG. 6, the motion sensor 10 may be used to detect bends that are greater than 90°. However, as is apparent to those of ordinary skill in the art, for such bends, light may travel through the bent portion 70 only by reflecting off of the inwardly facing portion 40 of the helically coiled portion 30 of the coiled member 20. Thus, the total amount of light received by the light receiving portion 60 of the light detector 24 includes only reflected light. Further, the total amount of light received by the light receiving portion 60 of the light detector 24 is less than the total amount of light received by the light receiving portion 60 of the light detector 24 when (as in FIGS. 4 and 5) the helically coiled portion 30 has been deflected less severely and (as in FIG. 3) the helically coiled portion 30 has not been deflected at all.

As explained above, the total amount of light reaching the light detector 24 varies depending at least in part on the amount of bend introduced in the helically coiled portion 30 of the coiled member 20. Specifically, the more severe the bend introduced, the less direct light will reach the light detector 24 until no direct light is received. Further, the more severe the bend introduced, the less reflected light is received by the light receiving portion 60 of the light detector 24. Depending upon the implementation details, at least some reflected light may be detectable by the light detector 24 no matter how severe a bend is introduced. In alternate embodiments, the light detector 24 may not be able to detect any reflected light when the helically coiled portion 30 is bent by more than at least a predetermined amount. As illustrated in FIG. 6, the motion sensor 10 may be used to detect bends that are greater than 90° because a detectable amount of the reflected light may traverse such a severe bend. However, when no light is detected by the light detector 24, the helically coiled portion 30 may be determined to have been bent by a maximum amount.

As is apparent to those of ordinary skill in the art, less than all of the light emitted by the light emitter 22 may reach the light detector 24. As mentioned above, the inwardly facing portion 40 may be other than planar. Thus, at least a portion of the light directed toward the inwardly facing portion 40 may be reflected back toward the first open end portion 36 instead of toward the light detector 24. As a result, when the helically coiled portion 30 of the coiled member 20 is bent to form the bent portion 70, less light from the light emitter 22 reaches the second open end portion 38. Further, if the inwardly facing portion 40 is other than planar, light may become trapped inside the channel 32, reflecting internally between two or more portions of the inwardly facing portion 40. The inwardly facing portion 40 may also be configured to absorb at least a portion of the light emitted by the light emitting portion 50 of the light emitter 22. Therefore, in such embodiments, each time light encounters the inwardly facing portion 40, a portion of that light is absorbed. Thus, the more times light reflects off the inwardly facing portion 40, the less light will actually reach the light detector 24.

Less than all of the light emitted by the light emitter 22 may reach the light detector 24 for other reasons. For example, when a helical member, such as the helically coiled portion 30, is sufficiently bent, openings (e.g., openings 80 shown in FIGS. 5 and 6) may be formed along the helical member. When this occurs, light may exit the channel 32 via the openings 80 formed in the helically coiled portion 30, which would further decrease the amount of light reaching the light detector 24. However, this is not a requirement.

Because the amount of light reaching the light detector 24 varies depending at least in part on the amount of bend introduced in the helically coiled portion 30 of the coiled member 20, the amount of light detected by the light detector 24 may be correlated with the amount of bend introduced in the helically coiled portion 30. Thus, the motion sensor 10 may be used to detect an amount of bend occurring along the longitudinal axis "α." However, as appreciated by those of ordinary skill in the art, the motion sensor 10 simply detects that its helically coiled portion 30 has been bent, not in which direction the helically coiled portion 30 has been bent.

The total amount of light detected by the light detector 24 may be correlated to the amount of bend introduced into the helically coiled portion 30 of the coiled member 20 using empirical data. In other words, the helically coiled portion 30 of the coiled member 20 may be bent by a series of incremental amounts and for each amount of bend introduced, the total amount of light detected by the light detector 24 recorded and associated with the amount of bend introduced into the helically coiled portion 30. This information may be used to construct a lookup table correlating the incremental bend amounts with the total amount of light detected. Whenever the helically coiled portion 30 is bent by an unknown amount, and a total amount of light is detected, the lookup table may be used to lookup the total amount of light detected, and identify an amount of bend associated with the total amount of light detected. If necessary, an interpolation method (e.g., linear interpolation) may be used to determine a bend amount associated with a total amount of light detected that falls between two values in the lookup table.

Alternatively, a function may be formulated in which the total amount of light detected is an independent variable and the amount of bend introduced into the helically coiled portion 30 is a dependent variable. It may be desirable to configure the motion sensor 10 such that the total amount of light detected has a linear relationship with the amount of bend introduced into the helically coiled portion 30 of the coiled member 20. Thus, in particular embodiments, the total amount of light detected may be supplied as a value of the independent variable in a linear function configured to calculate the amount of bend introduced into the helically coiled portion 30 of the coiled member 20.

Optionally, the helically coiled portion 30 may be coated with a coating configured to modify the reflective properties of the helically coiled portion 30. For example, the helically coiled portion 30 may be coated with zinc. The coating may increase the reflectivity of the inwardly facing portion 40. Alternatively, the coating may decrease the reflectivity and increase the light absorbency of the inwardly facing portion 40.

Figure 7:
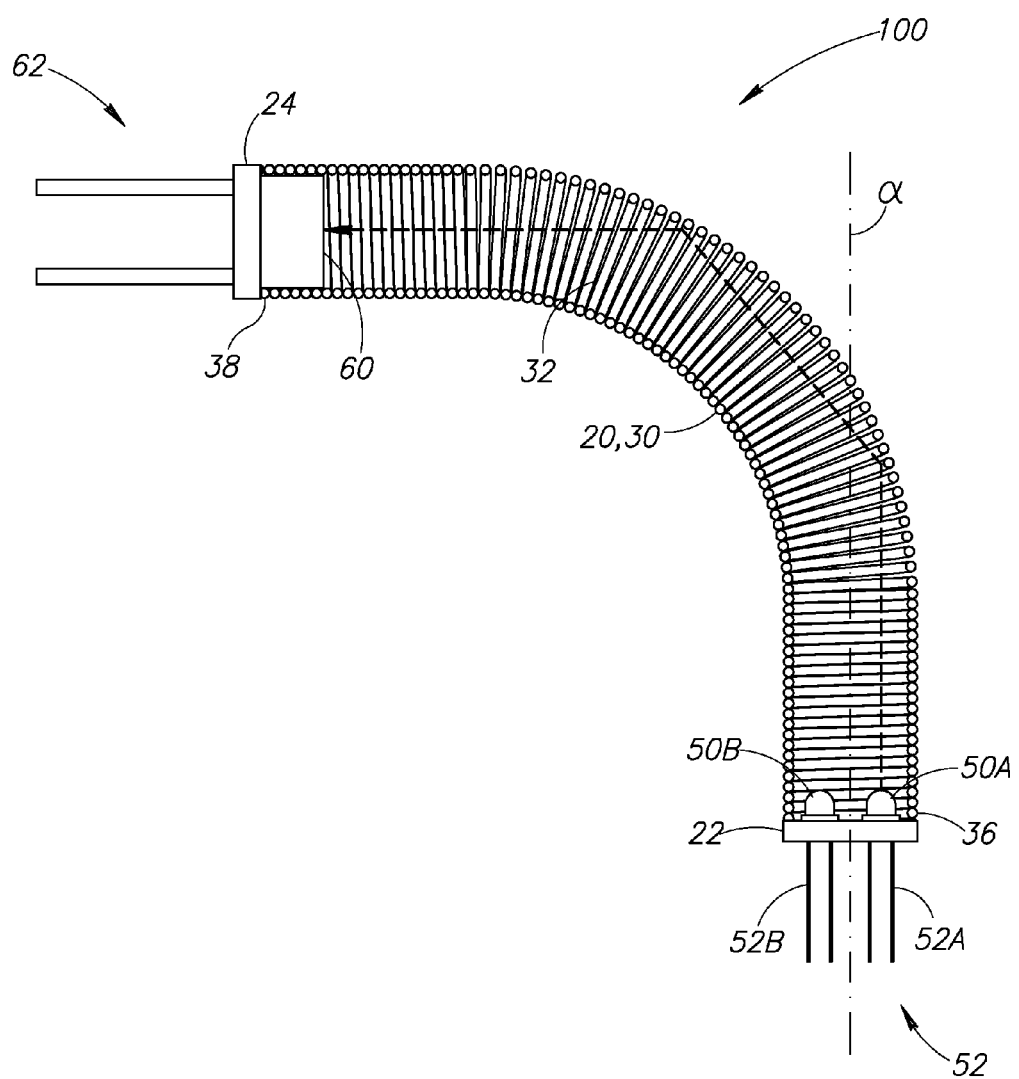
FIG. 7 is a longitudinal cross-sectional side view of a second embodiment of a motion sensor illustrated with its helically coiled portion deflected about 90° in a first direction.
Figure 8:
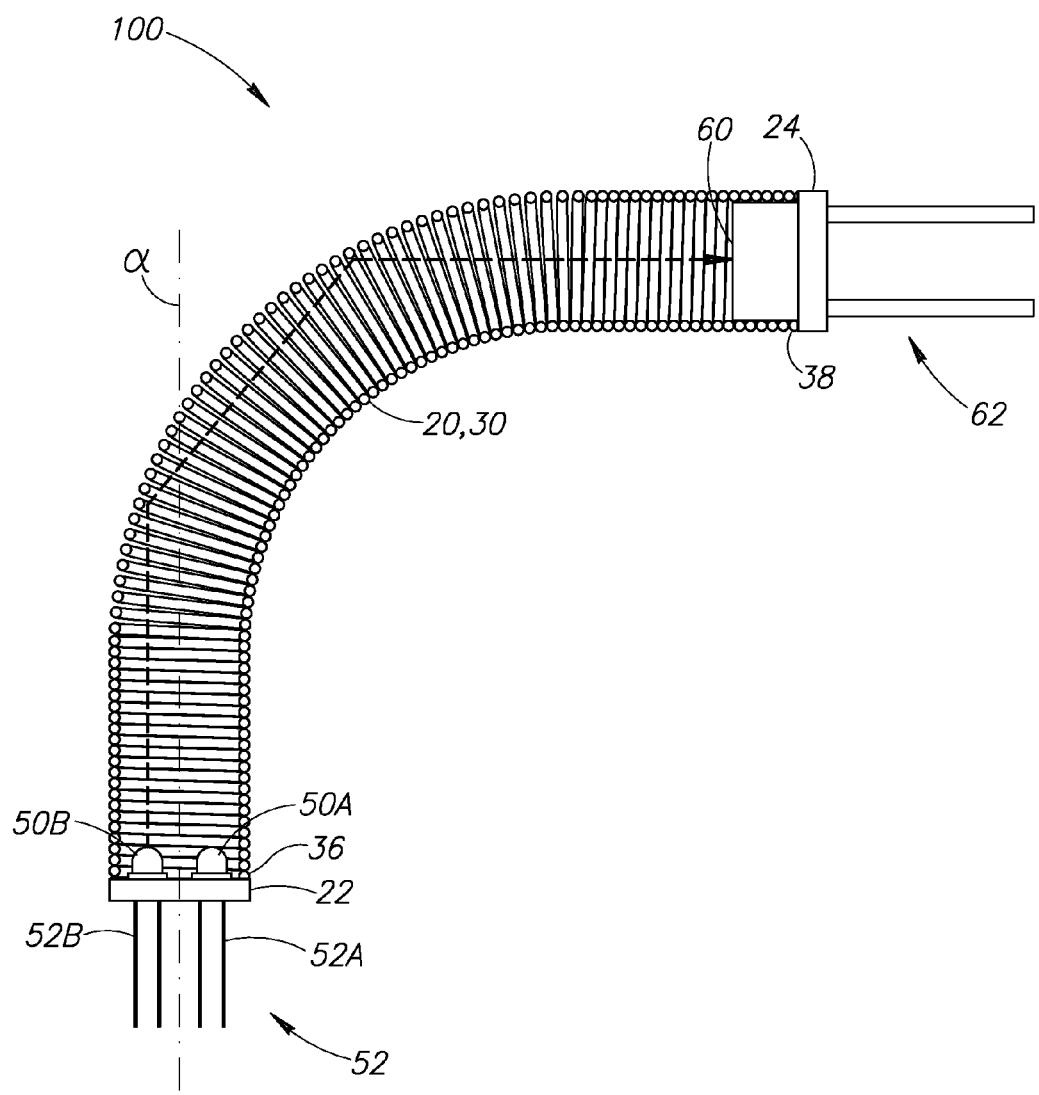
FIG. 8 is a longitudinal cross-sectional side view of the motion sensor of FIG. 7 illustrated with its helically coiled portion deflected about 90° in a second direction.

Referring to FIGS. 7 and 8, an alternate embodiment of the motion sensor 10 is provided. For ease of illustration, like reference numerals have been used to identify like components in FIGS. 1-8. FIGS. 7 and 8 illustrate a first embodiment of a motion sensor 100 configured to detect an amount of bend occurring along the longitudinal axis "α" in more than one direction. Specifically, the motion sensor 100 is configured to detect a first amount of bending occurring in a first direction and a second amount of bending occurring in a second direction. For ease of illustration, the first direction is toward the left-hand side of FIG. 7 and the second direction is toward the right-hand side of FIG. 8. Optionally, the helically coiled portion 30 may be constrained such that it bends in only the first and second directions.

Instead of including the single light emitting portion 50, the light emitter 22 of the motion sensor 100 includes a first light emitting portion 50A laterally spaced apart from a second light emitting portion 50B. Both the first and second light emitting portions 50A and 50B are positioned to emit light toward the light detector 24. The power receiving portion 52 is configured to provide power to both the first and second light emitting portions 50A and 50B. For example, the power receiving portion 52 may have a first portion 52A configured to provide power to the first light emitting portion 50A and a second portion 52B configured to provide power to the second light emitting portion 50B.

The first light emitting portion 50A is configured to emit light that is distinguishable in some manner from the light emitted by the second light emitting portion 50B. Further, the second light emitting portion 50B is configured to emit light that is distinguishable in some manner from the light emitted by the first light emitting portion 50A. For example, the first light emitting portion 50A may emit light having a wavelength that is different (and therefore, has a different color) from the wavelength of the light emitted by the second light emitting portion 50B.

Alternatively, the first and second light emitting portions 50A and 50B may emit light a different times. In such embodiments, the first and second light emitting portions 50A and 50B may emit light having the same wavelength. Further, the power receiving portion 52 may be configured to selectively illuminate the first and second light emitting portions 50A and 50B. For example, the power receiving portion 52 may illuminate the first and second light emitting portions 50A and 50B in an alternating or strobing pattern. In such an embodiment, light emitted from one of the first and second light emitting portions 50A and 50B is distinguishable from the light emitted by the other of the first and second light emitting portions 50A and 50B because the light emitting portions are not illuminated at the same time. Thus, timing may be used to determine the source of the light received by the light detector 24.

The light detector 24 is configured to receive the light emitted by the first and second light emitting portions 50A and 50B. In embodiments in which the first and second light emitting portions 50A and 50B emit light having different wavelengths, the light detector 24 is configured to detect both wavelengths of light separately and transmit a signal via the signal transmitting portion 62 communicating an amount of light received having each of the wavelengths.

In embodiments in which the first and second light emitting portions 50A and 50B are not illuminated at the same time, the motion sensor 100 may be coupled to a timer (not shown) or a processor 460 (see FIG. 14) configured to time the illumination of each of the first and second light emitting portions 50A and 50B and associate the light received by the light detector 24 with the appropriate light emitting portion.

Because the light emitted by the first light emitting portion 50A is distinguishable from the light emitted by the second light emitting portion 50B, the total amount of light (direct and reflected) detected by the light detector 24 may be associated with the particular light emitting portion that emitted the light. Then, for each of the light emitting portions 50A and 50B, the total amount of light detected that originated from the light emitting portion may be correlated with an amount of bend in a selected direction introduced into the helically coiled portion 30 of the coiled member 20 using empirical data. In other words, the helically coiled portion 30 of the coiled member 20 may be bent by a series of incremental amounts in the first direction and for each amount of bend introduced, the total amount of light detected by the light detector 24 that was emitted by the first light emitting portion 50A recorded and associated with the amount of bend in the first direction. This information may be used to construct a lookup table correlating the incremental bend amounts in the first direction with the total amount of light detected by the light detector 24 that was emitted by the first light emitting portion 50A. Then, the helically coiled portion 30 of the coiled member 20 may be bent by a series of incremental amounts in the second direction and for each amount of bend introduced, the total amount of light detected by the light detector 24 that was emitted by the second light emitting portion 50B recorded and associated with the amount of bend in the second direction. This information may be used to construct a lookup table correlating the incremental bend amounts in the second direction with the total amount of light detected by the light detector 24 that was emitted by the second light emitting portion 50B.

Whenever the helically coiled portion 30 is bent by an unknown amount in the first and/or second direction, the lookup table may be used to lookup the amount of light detected that was emitted by the first light emitting portion 50A and the second light emitting portion 50B. The total amount of light detected that originated from the first light emitting portion 50A corresponds to an amount of bend in the first direction and the total amount of light detected that originated from the second light emitting portion 50B corresponds to an amount of bend in the second direction. If necessary, an interpolation method (e.g., linear interpolation) may be used to determine a bend amount corresponding an amount of light detected that falls between two values in the lookup table.

Figure 9:
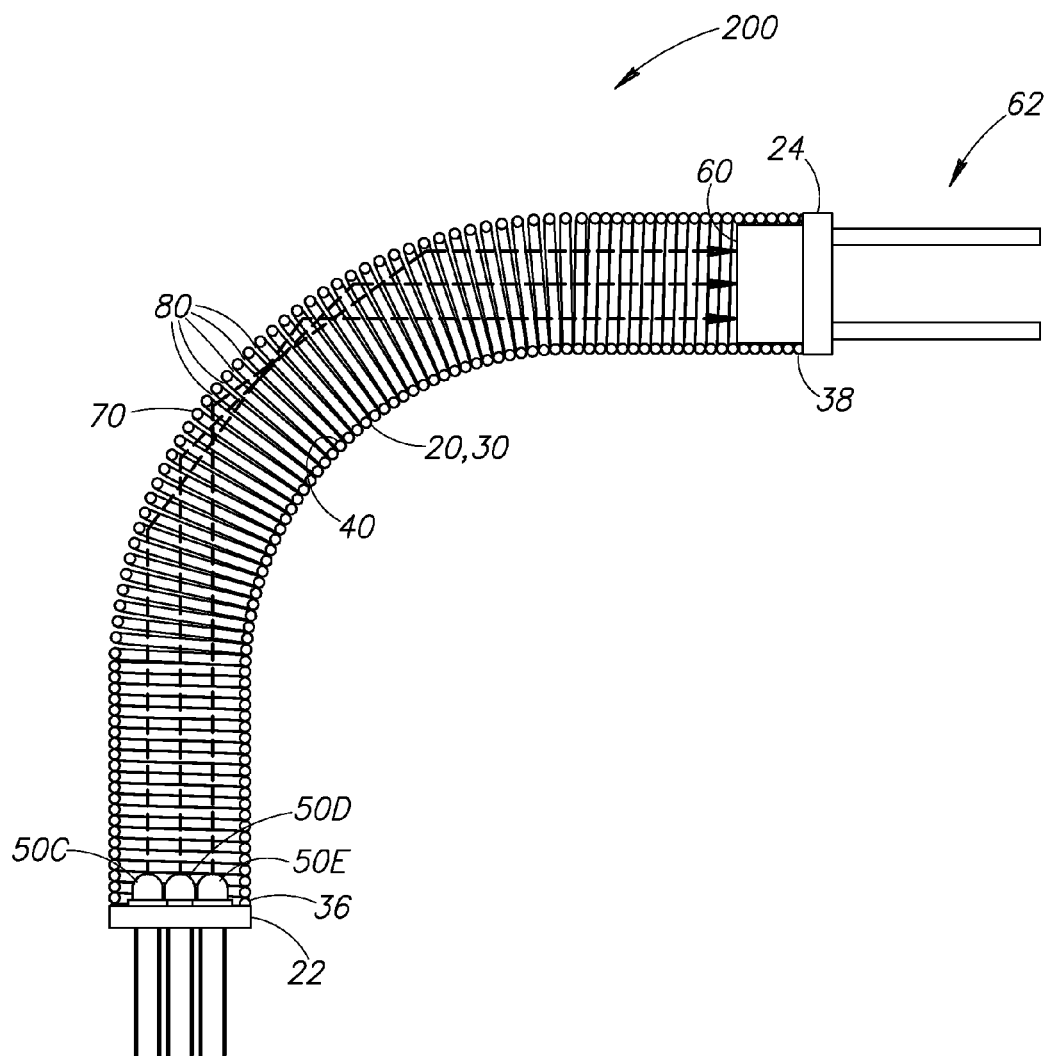
FIG. 9 is a longitudinal cross-sectional side view of a third embodiment of a motion sensor illustrated with its helically coiled portion deflected about 90° in a first direction

The light emitter 22 of the motion sensor 100 includes a different light emitting portion (e.g., the light emitting portions 50A and 50B) for each bend direction relative to the longitudinal axis "α." Through application of ordinary skill in the art to the present teachings, the motion sensor 100 may be modified to detect bending in more than two directions. For example, FIG. 9 illustrates a motion sensor 200 configured to detect bending in three directions. Like reference numerals have been used to identify like components in FIGS. 1-9. The light emitter 22 of the motion sensor 200 includes first, second, and third spaced apart light emitting portions 50C, 50D, and 50E. Light emitted by each of the light emitting portions 50C, 50D, and 50E is configured to be distinguishable from light emitted by the other light emitting portions. For example, the light emitting portions 50C, 50D, and 50E may each emit light having a different wavelength. By way of a non-limiting example, the light emitting portions 50C, 50D, and 50E may emit red light, green light, and blue light, respectively. Alternatively, the light emitting portions 50C, 50D, and 50E may emit light at different times (e.g., the light emitting portions 50C, 50D, and 50E may strobe). Light emitted by each of the light emitting portions 50C, 50D, and 50E is used to detect bending in a different direction.

Figure 10:
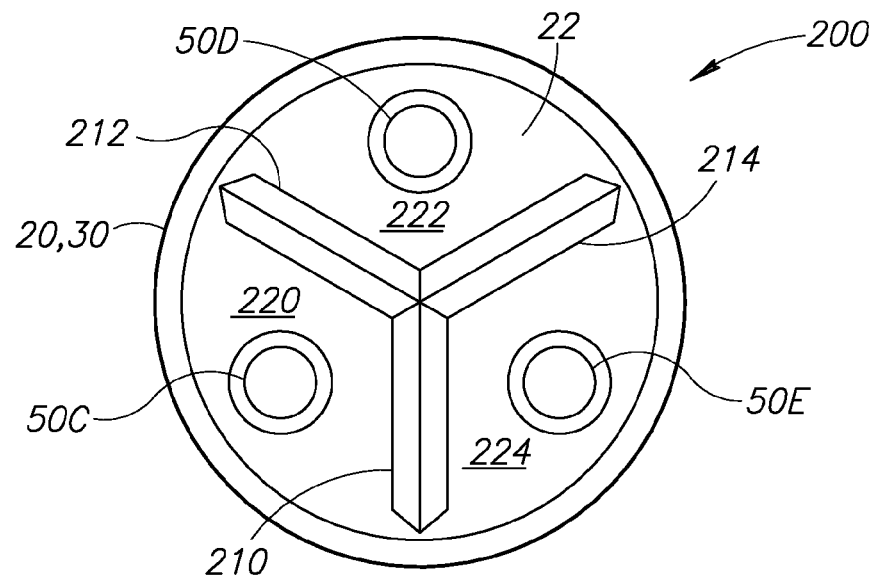
FIG. 10 is a sectional top view of a forth embodiment of a motion sensor.

Optionally, referring to FIG. 10, the motion sensor 200 may include longitudinally extending dividing walls 210, 212, and 214 that extend longitudinally in the channel 32 between the light emitter 22 and the light detector 24 (see FIG. 9). The dividing walls 210, 212, and 214 illustrated divide the channel 32 into sub-channels 220, 222, and 224.

At the first open end portion 36 (see FIG. 9), the light emitting portion 50C is positioned to emit light into the sub-channel 220, the light emitting portion 50D is positioned to emit light into the sub-channel 222, and the light emitting portion 50E is positioned to emit light into the sub-channel 224. The dividing walls 210, 212, and 214 are configured to reflect light and prevent light in one of the sub-channels 220, 222, and 224 from passing into another of the sub-channels. Thus, light emitted from the light emitting portion 50C travels only within the sub-channel 220, light emitted from the light emitting portion 50D travels only within the sub-channel 222, and light emitted from the light emitting portion 50E travels only within the sub-channel 224. However, as discussed above, in particular embodiments, light emitted from the light emitting portions 50C, 50D, and 50E may exit the helically coiled portion 30 through the openings 80 (see FIG. 9). Further, the dividing walls 210, 212, and 214 may absorb at least a portion of the light emitted by the light emitting portions 50C, 50D, and 50E.

In embodiments including the dividing walls 210, 212, and 214, the light receiving portion 60 (see FIG. 9) of the light detector 24 (see FIG. 9) may be divided into regions (not shown) configured to detect light emitted from each of the light emitting portions 50C, 50D, and 50E within the sub-channels 220, 222, and 224. In such embodiments, the light emitted by each of the light emitting portions 50C, 50D, and 50E need not be distinguishable from the light emitted by the other light emitting portions. The light detector 24 (see FIG. 9) may be configured to detect light received by each separate region of the light receiving portion 60 (see FIG. 9) and transmit a signal via the signal transmitting portion 62 (see FIG. 9) communicating the amounts of light received by each region.

Figure 11:
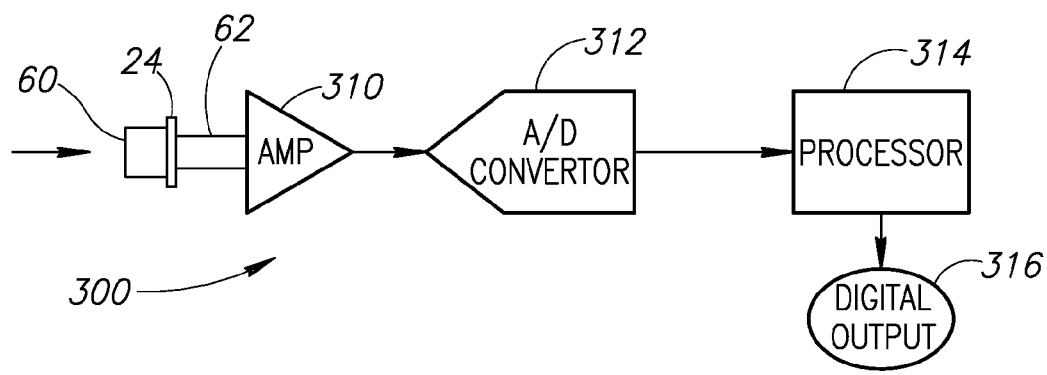
FIG. 11 is a block diagram of a circuit configured to receive an analog signal from a motion sensor and output a digital output signal.

FIG. 11 provides a block diagram of a circuit 300 configured to process the analog signal transmitted by the signal transmitting portion 62 of the light detector 24 of any of the motion sensors 10, 100, and 200 described above. The circuit 300 includes an amplifier 310 connected to the signal transmitting portion 62 of the light detector 24. The amplifier 310 amplifies the analog signal received from the signal transmitting portion 62 and transmits the amplified analog signal to an analog-to-digital ("A/D") converter 312. The A/D converter 312 converts the analog signal into a digital signal that is forwarded to a processor 314. The processor 314 transforms the digital signal into a digital output signal 316 configured for use by a motion capture system 360 (illustrated in FIG. 13). Thus, the circuit 300 may be used to digitize the analog signal transmitted by the signal transmitting portion 62 of the light detector 24.

Figure 12:
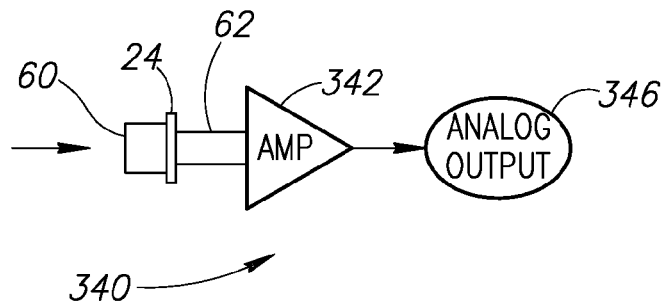
FIG. 12 is a block diagram of a circuit configured to receive an analog signal from a motion sensor and output an amplified analog output signal.

FIG. 12 provides a block diagram of a circuit 340 configured to process the analog signal transmitted by the signal transmitting portion 62 of the light detector 24 of any of the motion sensors 10, 100, and 200 described above. The circuit 340 includes an amplifier 342 connected to the signal transmitting portion 62 of the light detector 24. The amplifier 342 amplifies the analog signal received from the signal transmitting portion 62 to provide an analog output signal 346 configured for use by the motion capture system 360 (illustrated in FIG. 13).

Figure 13:
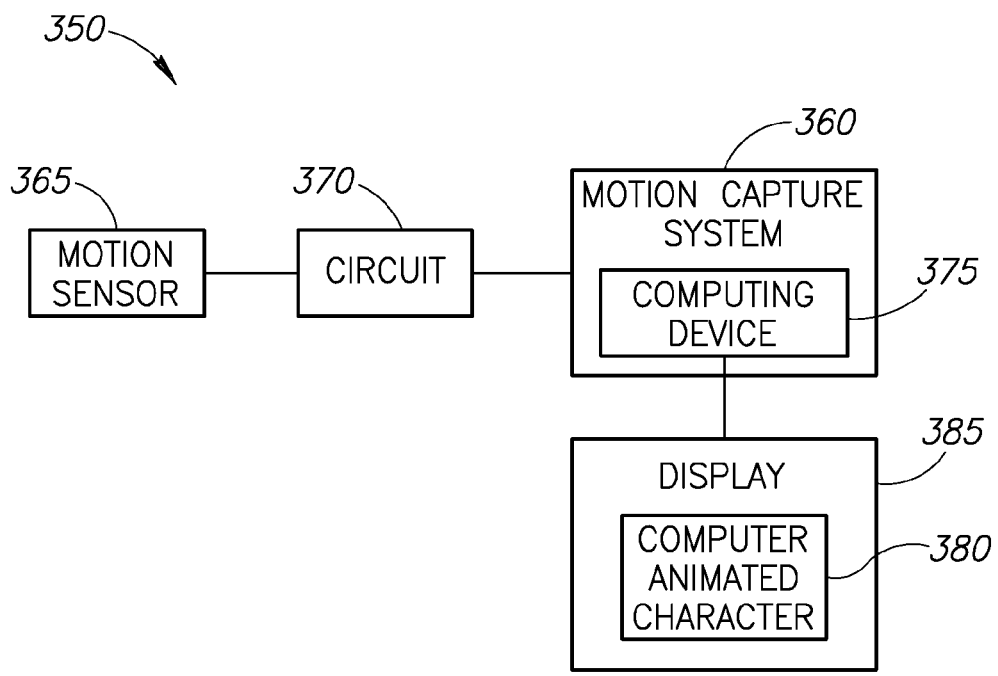
FIG. 13 is a block diagram of a system configured to receive an analog signal from a motion sensor and use that analog signal to animate a computer generated animation.

FIG. 13 is a block diagram of a system 350 that includes the motion capture system 360 coupled to a motion sensor 365 by a circuit 370. The motion sensor 365 may be implemented as the motion sensor 10, the motion sensor 100, the motion sensor 200, or a motion sensor constructed with more than three light emitting portions. The circuit 370 may be implemented using either the circuit 300, the circuit 340, or the like.

Motion capture systems are well-known and the motion capture system 360 may be implemented using any motion capture system configured to receive input from one or more sensors, such as the motion sensors 10, 100, or 200 and use that input to animate a computer generated object or character. Therefore, the motion capture system 360 will not be described in detail. However, as is apparent to those of ordinary skill in the art, the motion capture system 360 may include one or more computing device (e.g., a computing device 375) configured to receive the digital output signal 316 (see FIG. 11) or the analog output signal 346 (see FIG. 12), correlate the signal with an amount of bending applied to the motion sensor (e.g., the motion sensor 10, 100, or 200), translate the amount of bending into an amount of motion (e.g., bending), and animate a computer generated animation 380 (e.g., an object, character, and the like) using the amount of motion. Optionally, the computer generated animation 380 may be displayed on a display device 385.

Figure 14:
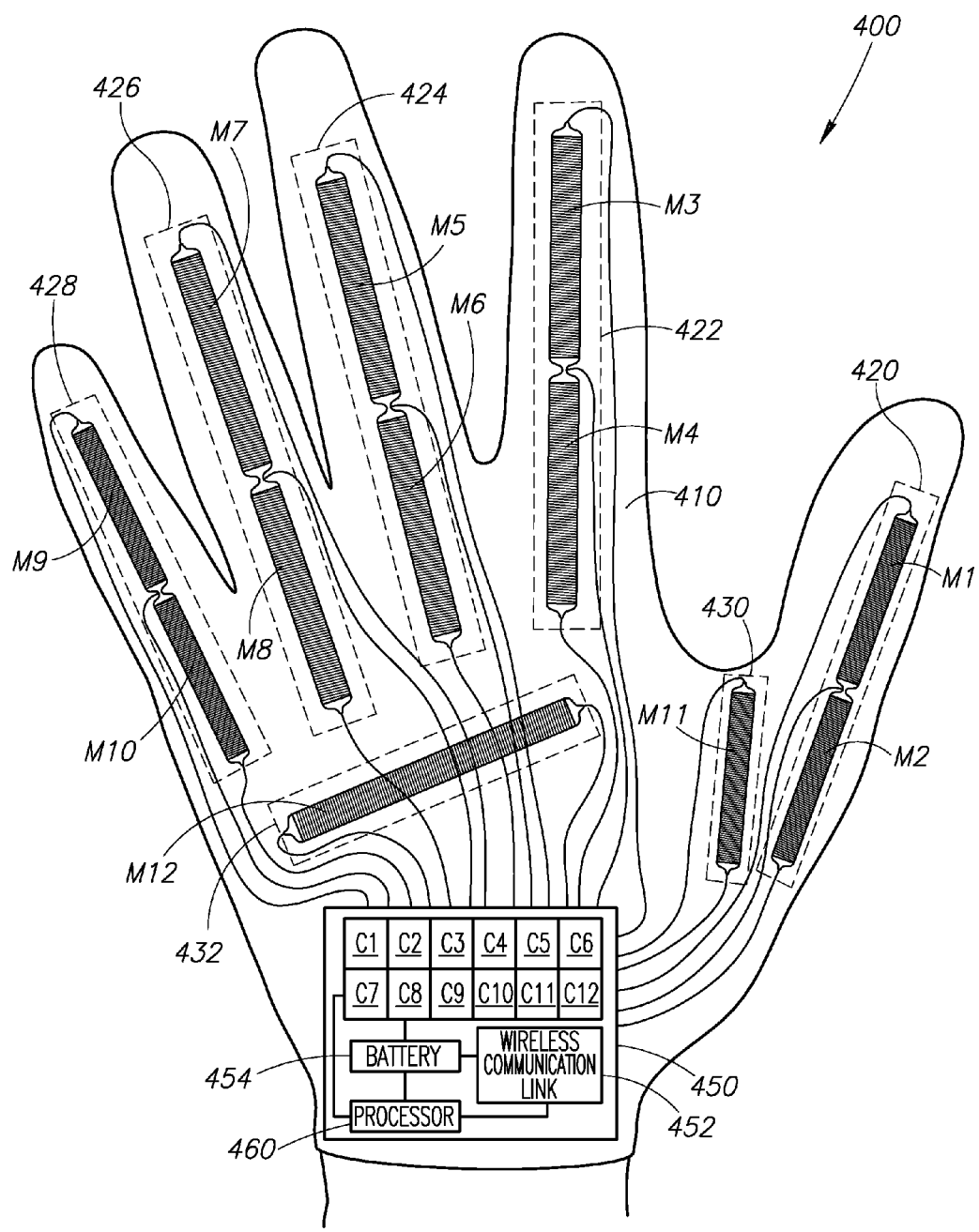
FIG. 14 is a view of a back of a data glove equipped with a plurality of motion sensors.

The motion sensors 10, 100, and/or 200 may be attached to any body part or structure configured to bend or pivot. For example, FIG. 14 illustrates a data glove 400 including a plurality of motion sensors "M1" to "M12" positioned to detect bending in various portions of the hand and fingers. Each of the motion sensors "M1" to "M12" may be implemented as the motion sensor 10 (see FIGS. 1-6), the motion sensor 100 (see FIGS. 7 and 8), the motion sensor 200 (see FIGS. 9 and 10), or a motion sensor including more than three light emitting portions.

The glove 400 has an outer surface 410. The motion sensors "M1" to "M12" are attached to the outer surface 410 adjacent predetermined bendable portions of the hand. In the embodiment illustrated, the motion sensors "M1" to "M12" are attached to the glove 400 in predetermined locations by flexible outer coverings 420, 422, 424, 426, 428, 430, and 432 attached to the outer surface 410 of the glove 400. By way of a non-limiting example, the flexible outer coverings 420, 422, 424, 426, 428, 430, and 432 may be implemented as pieces of fabric sewn to the outer surface 410 of the glove 400. In alternate embodiments, each of the motion sensors "M1" to "M12" may be attached to the glove 400 by a separate flexible outer covering. Each of the motion sensors "M1" to "M12" is positioned between the outer surface 410 of the glove 400 and an inside surface of one of the outer coverings 420, 422, 424, 426, 428, 430, and 432 (e.g., a piece of dark cloth). Each of the outer coverings 420, 422, 424, 426, 428, 430, and 432 may be substantially non-transparent or opaque, not allowing light to pass therethrough.

A substrate 450 (e.g., a printed circuit board) may be coupled to the glove 400 near at location corresponding to the back of the hand near the wrist. Circuits "C1" to "C12" are arranged on the substrate 450. The motion sensors "M1" to "M12" are connected to the circuits "C1" to "C12," respectively, by wires. Each of the circuits "C1" to "C12" may be implemented as the circuit 300, the circuit 340, or the like. A communication link, such as a wireless communication link 452, a transmission line, and the like, communicates the digital output signals 316 (see FIG. 11) or analog output signals 346 (see FIG. 12) received from the circuits "C1" to "C12" to the motion capture system 360.

In wireless implementations, a battery 454 may be connected to the substrate 450. The battery 454 provides power to the circuits "C1" to "C12" and the wireless communication link 452.

Optionally, a processor 460 may be connected to the substrate 450. The processor 460 may process the digital output signals 316 (see FIG. 11) or analog output signals 346 (see FIG. 12) before they are transferred to the motion capture system 360. In embodiments in which the light emitters 22 of the motion sensors "M1" to "M12" include multiple light emitting portions (e.g., the light emitting portions 50C, 50D, and 50E) differentiated by strobing, the processor 460 may time the strobing and correlate the light detected with the appropriate light emitting portion of the light emitter 22.

For ease of illustration, the knuckles connecting the thumb, index finger, middle finger, ring finger, and pinky finger to the palm of the hand (or the metacarpophalangeal joints) will be referred to as the base knuckles. The knuckles of the figures adjacent the base knuckles (or the proximal interphalangeal joints) will be referred to as the middle knuckles. The next knuckles of the index finger, middle finger, ring finger, and pinky finger (or the distal interphalangeal joints) will be referred to as the top knuckles.

The motion sensors "M2," "M4," "M6," "M8," and "M10" are positioned adjacent and extend across the base knuckles. Thus, the motion sensors "M2," "M4," "M6," "M8," and "M10" may be used to detect when the hand has been closed such as to grasp an object or moved in the opposite direction to open the hand. The motion sensors "M1," "M3," "M5," "M7," and "M9" are positioned adjacent and extend across the middle knuckles above the knuckles connecting the fingers (including the thumb) to the palm of the hand. Thus, the motion sensors "M1," "M3," "M5," "M7," and "M9" may detect when the figures have been wrapped around an object or balled into a fist, or moved in the opposite direction.

The motion sensor "M11" may be positioned adjacent the thumb and used to detect when the thumb has been rotated toward or away from the palm of the hand. The motion sensor "M12" may be positioned laterally across the back of the hand to detect when the hand has been curled or uncurled.

Optionally, the motion sensors "M1," "M3," "M5," "M7," and "M9" may be omitted. In such embodiments, the motion capture system 360 may animate the middle knuckles. Optionally, motion sensor (not shown) may be positioned adjacent the top knuckles and used to detect bending of those knuckles.

The bending detected by the motion sensors "M1" to "M12" may be used to animate a computer generated animated hand.

Figure 15:
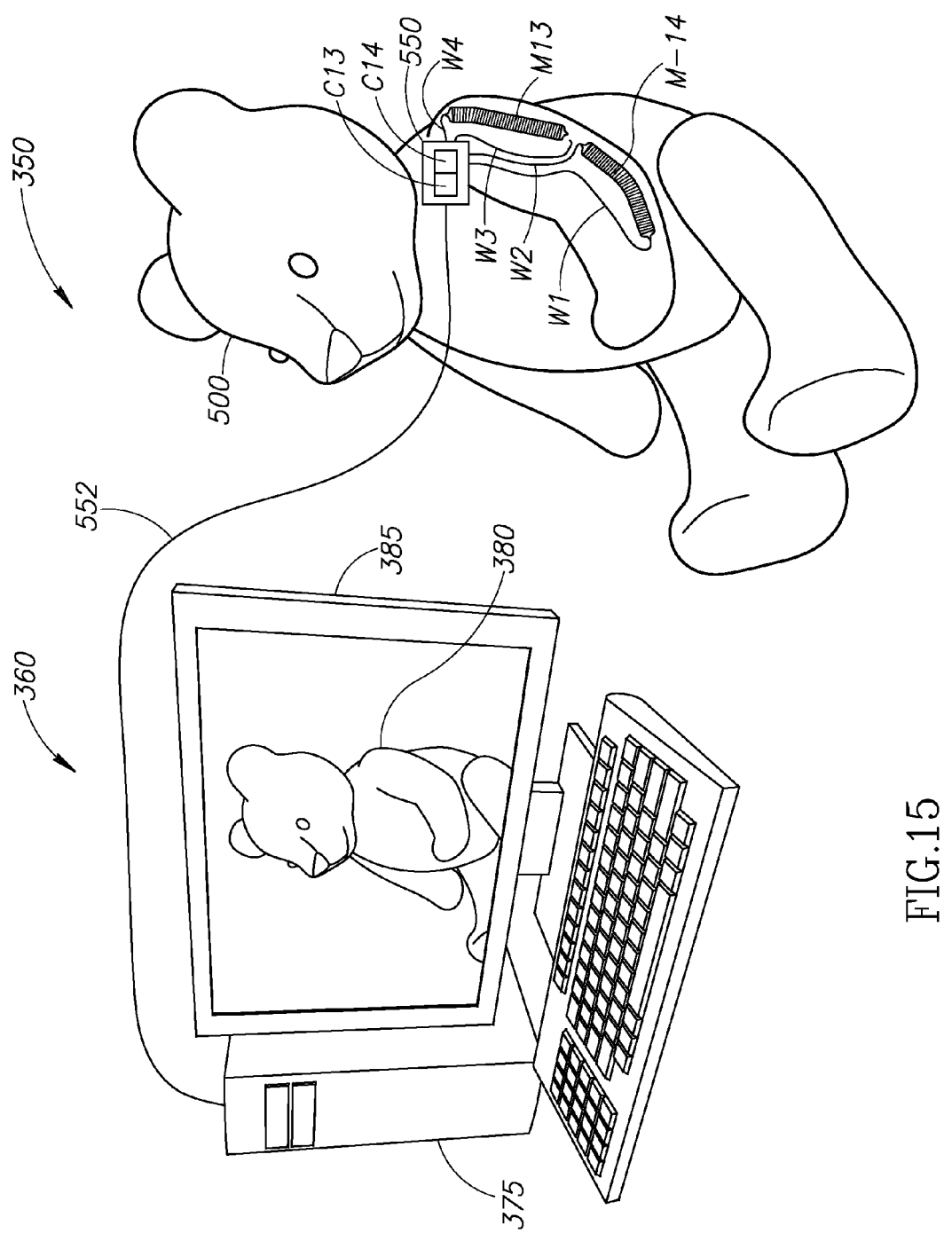
FIG. 15 is a perspective view of a puppet equipped with a pair of motion sensors connected to a computing device of a motion capture system configured to receive analog signals from the motion sensors and use those analog signals to animate a computer generated animation.

The motion sensors 10, 100, and/or 200 may be used to detect bending in inanimate objects, such as puppets and prosthetics. For example, FIG. 15 illustrates a puppet 500. A first motion sensor "M13" is positioned adjacent a first joint (e.g., a shoulder) of the puppet 500 and a second motion sensor "M14" is positioned adjacent a second joint (e.g., an elbow) of the puppet 500. The motion sensors "M13" and "M14" are connected by wires "W1" to "W4" to a substrate 550. The substrate 550 includes a circuit "C13" coupled to the motion sensor "M13" by the wire "W4." The circuit "C13" is configured to receive the analog signal from the motion sensor "M13." The substrate 550 also includes a circuit "C14" coupled to the motion sensor "M14" by the wire "W2." The circuit "C14" is configured to receive the analog signal from the motion sensor "M14." The circuits "C13" and "C14" may each be implemented as the circuit 300, the circuit 340, or the like.

A communication link, such as a transmission line 552, a wireless communication link, and the like, communicates the digital output signals 316 (see FIG. 11) or analog output signals 346 (see FIG. 12) received from the circuits "C13" and "C14" to the computing device 375 of the motion capture system 360. The motion capture system 360 uses the digital output signals 316 or analog output signals 346 to animate the computer generated animation 380 displayed on the display 385.

In wireless implementations, a battery (not shown) may be connected to the substrate 550. The battery 454 may provide power to the circuits "C13" and "C14." Optionally, a processor (not shown) may be connected to the substrate 550. The processor may process the signal before it is transferred to the motion capture system 360. In embodiments in which the light emitters 22 (see FIGS. 1-10) of the motion sensors "M13" and "M14" include multiple light emitting portions (e.g., the light emitting portions 50A and 50B illustrated in FIGS. 7 and 8) differentiated by strobing, the processor may time the strobing and correlate the light detected with the appropriate light emitting portion of the light emitter 22.

Figure 16:
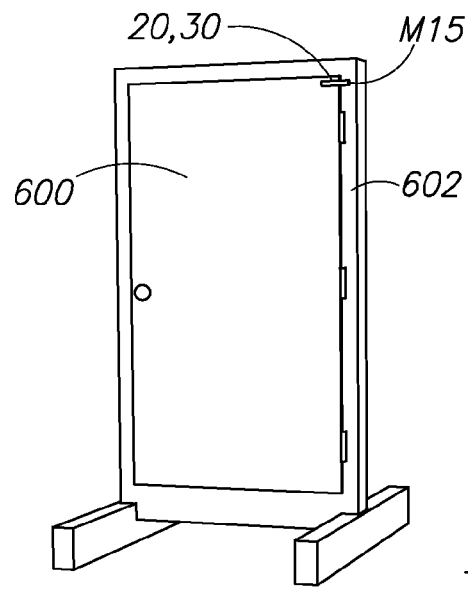
FIG. 16 is a perspective view of a door mounted inside a door jam and a motion sensor connected to both the door and the door jam.

Referring to FIG. 16, the motion sensors 10, 100, and/or 200 may be used to detect pivoting or other types of rotation in inanimate objects. For example, a motion sensor "M15" may be positioned between a door 600 and its door jam 602. When the door 600 is opened, the helically coiled portion 30 of the coiled member 20 of the motion sensor "M15" will be deflected. As described above, when this occurs, the amount of bending introduced into the helically coiled portion 30 may be determined and used to animate a computer generated animation of an object, such as a door. Thus, when the door 600 is opened, a corresponding computer generated animated door may be opened automatically by the motion capture system 360 (see FIGS. 13 and 15) by a corresponding amount. Similarly, when the door 600 is closed, the corresponding computer generated animated door may be closed automatically by the motion capture system 360 (see FIGS. 13 and 15).

Figure 17:
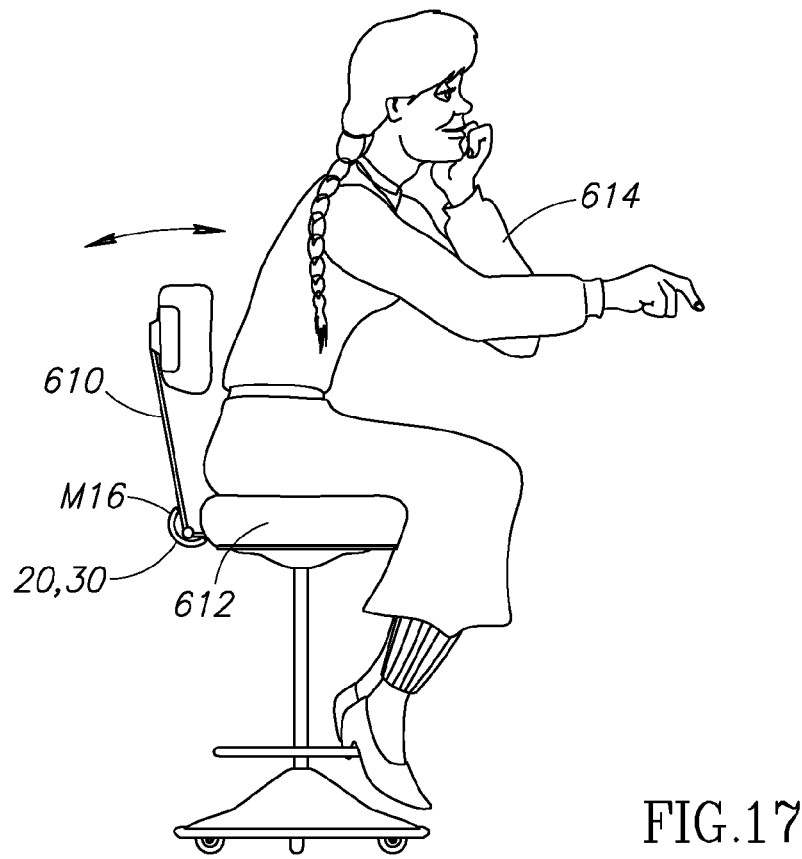
FIG. 17 is a perspective view of an actor seated in a chair and a motion sensor connected to both the chair back and the chair seat.

Referring to FIG. 17, by way of another non-limiting example, a motion sensor "M16" may be positioned between a chair back 610 and a chair seat 612 with one end of the helically coiled portion 30 is coupled to the chair back 610 and the other end of the helically coiled portion 30 is coupled to the chair seat 612. When an actor 614 reclines the chair back 610, the helically coiled portion 30 of the coiled member 20 of the motion sensor "M16" will straighten or be less deflected. As described above, the amount of bending introduced into the helically coiled portion 30 may be determined and used to animate a computer generated animation of an object, such as a chair. Thus, when the chair back 610 is reclined, a corresponding computer generated animated chair back may be reclined automatically by the motion capture system 360 (see FIGS. 13 and 15). Similarly, when the chair back 610 is returned to its upright position (increasing the deflection of the helically coiled portion 30 of the motion sensor "M16"), the corresponding computer generated animated chair back may be returned to its upright position automatically by the motion capture system 360 (see FIGS. 13 and 15).

Figure 18:
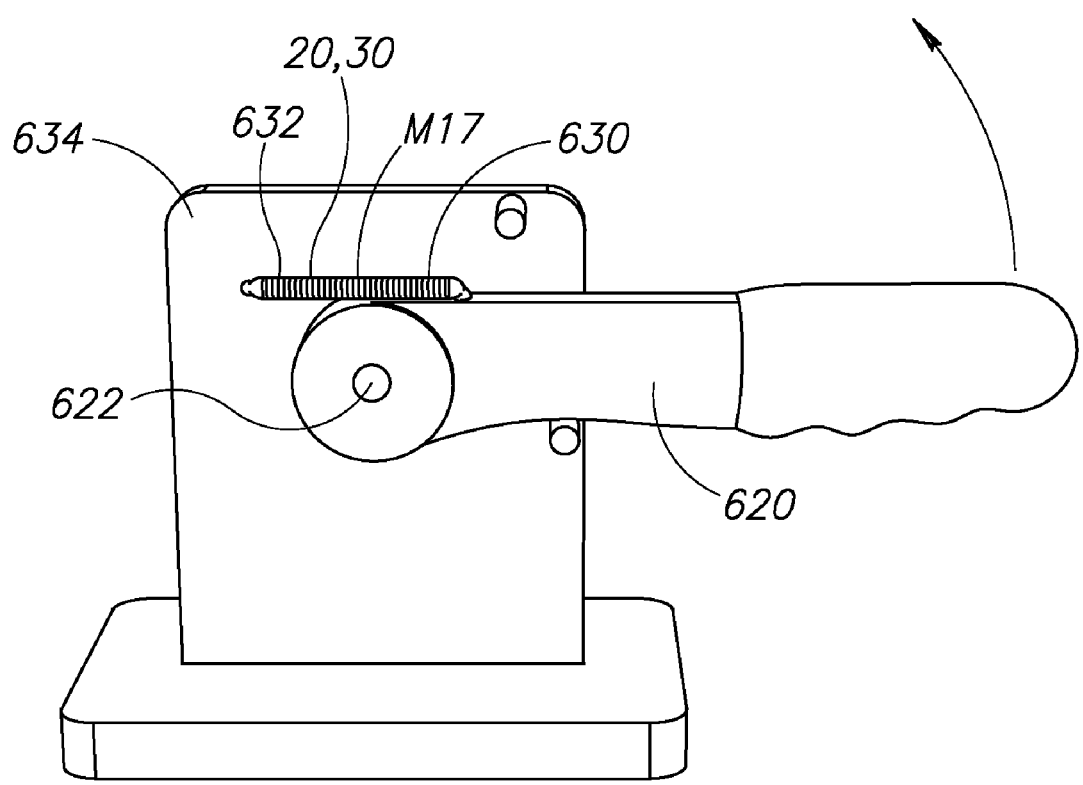
FIG. 18 is a perspective view of a lever configured to pivot about a fulcrum and a motion sensor connected to both the lever and an adjacent stationary object.

The motion sensors 10, 100, and/or 200 may also be used to detect bending or pivoting with respect to a lever configured to pivot about a fulcrum. FIG. 18 illustrates a lever 620 configured to pivot about a fulcrum 622. A first end portion 630 of a motion sensor "M17" is connect to the lever 620. A second end portion 632 of the motion sensor "M17" is connect to a stationary or non-moving structure 634 adjacent the lever 620. When the lever 620 pivots about the fulcrum 622, the helically coiled portion 30 of the coiled member 20 of the motion sensor "M17" is bent around the fulcrum. As described above, when this occurs, the amount of bending introduced into the helically coiled portion 30 may be determined and used to animate a computer generated animation of the lever.

Each of the motion sensors "M15," "M16," and "M17" may be implemented as the motion sensor 10, the motion sensor 100, the motion sensor 200, or a motion sensor constructed with more than three light emitting portions.

While the examples above describe the motion sensors as animating characters and objects corresponding to similar real world objects, those of ordinary skill in the art appreciate that the motion sensors may be used to animate computer generated animations that have no relationship or similarity to the real word objects to which the motion sensors are attached. Further, the motion sensors may be used to control devices such as robots, prosthetics, and the like. The motion sensors may also be used to collect information related to bending or pivoting for diagnostic testing, materials studies, medical applications, and the like.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A motion sensor comprising:
   a helically coiled member defining an internal open ended channel having a first open end portion opposite a second end portion and allowing the transmission of light therebetween, the helically coiled member being bendable when a lateral force is applied thereto;
   a light emitter adjacent the first open end portion positioned to emit light into the channel for at least a portion of the light to travel through the channel toward the second open portion, at least a portion of the light traveling through the channel being reflected by the helically coiled member into the channel when the helically coiled member is bent; and
   a light detector adjacent the second open end portion positioned to receive light that traveled through the channel, an amount of light received by the light detector varying depending at least in part on an amount by which the helically coiled member has been bent, and the light detector being further configured to transmit a signal indicating the amount of light received by the light detector.

2. The motion sensor of claim 1, wherein the amount of light received by the light detector is a linear function of the amount by which the helically coiled member has been bent.

3. The motion sensor of claim 1, wherein the channel is defined by an inwardly facing portion of the helically coiled member and the inwardly facing portion is other than planar.

4. The motion sensor of claim 1, wherein the channel is unobstructed to permit the transmission of light therethrough.

5. The motion sensor of claim 1, wherein the light emitter comprises a plurality of light emitting portions each configured to be selectively illuminated such that at least in some instances only one of the light emitting portions is illuminated.

6. The motion sensor of claim 5, further comprising:
   a processor configured to selectively illuminate the light emitting portions and associate the amount of light received by the light detector with one of the light emitting portions that emitted the light detected.

7. The motion sensor of claim 1, wherein the channel is divided into a plurality of longitudinally extending sub-channels by one or more non-transparent dividing walls,
   each sub-channel extends from a location toward the first open end portion to a location toward the second open end portion of the channel, and
   the light emitter comprises a light emitting portion for each sub-channel, each light emitting portion emitting light into only a corresponding one of the sub-channels.

8. The motion sensor of claim 1, wherein the light emitter is configured to emit light having a plurality of different wavelengths,
   the light detector is configured to detect light having each of the different wavelengths, and
   the light detector is configured to transmit a signal indicating an amount of light detected for each of the different wavelengths.

9. The motion sensor of claim 1, wherein the light emitter emits a first color light, a second color light, and a third color light;
   the light detector is configured to detect the first color light, the second color light, and the third color light, to distinguish the first color light from the second color light, to distinguish the first color light from the third color light, and to distinguish the second color light from the third color light, and
   the light detector is further configured to transmit a signal indicating an amount of the first color light detected, an amount of the second color light detected, and an amount of the third color light detected.

10. The motion sensor of claim 9, wherein the light emitter comprises:
    a first light emitting portion configured to emit the first color light;
    a second light emitting portion configured to emit the second color light; and
    a third light emitting portion configured to emit the third color light.

11. The motion sensor of claim 1, wherein the helically coiled member comprises a reflective coating.

12. The motion sensor of claim 1, wherein the light emitter is an infrared light emitting diode or a coherent laser light emitter.

13. A bend sensor for use with a motion capture system, the bend sensor comprising:
    an elongated coil spring configured to deflect laterally in response to a laterally applied force and defining a longitudinally extending internal light transmitting channel;
    a light emitter adjacent one end of the coil spring positioned to emit light into the internal channel of the coil spring, at least a portion of the light being reflected by the coil spring into the internal channel when the coil spring is deflected laterally; and
    a light detector adjacent the other end of the coil spring positioned to receive light from the internal channel of the coil spring, an amount of light received from the internal channel of the coil spring varying depending at least in part on an amount by which the coil spring has been deflected laterally, and the light detector being further configured to transmit a signal to the motion capture system indicating an the amount of light received by from the internal channel of the coil spring.

14. A system for use with a first member configured to pivot relative to a second member, the system comprising:
    a bend sensor comprising a helically coiled member having an interior channel, a first end couplable to the first member, and a second end couplable to the second member, the bend sensor further comprising a light emitter coupled to one of the first and second ends, and a light detector coupled to the other of the first and second ends, the light emitter emitting light into the interior channel, the helically coiled member being configured to bend laterally when (i) the first end is coupled to the first member, (ii) the second end is coupled to the second member, and (iii) the first member is pivoted relative to the second member, the helically coiled member being further configured to reflect at least a portion of the light into the interior channel when the helically coiled member is bent, an amount of light from the light emitter traveling through the interior channel and reaching the light detector varying based at least in part on an amount by which the helically coiled member is bent, the light detector being configured to transmit a signal encoding an indication of an amount of light received by the light detector; and a motion capture system configured to receive the signal transmitted by the light detector, identify a bend amount associated with the indication of the amount of light received by the light detector encoded in the signal, and animate a computer generated animation based on the bend amount.

15. The system of claim 14, wherein the bend amount is determinable as a linear function of the indication of the amount of light received by the light detector encoded in the signal, and the motion capture system calculates the bend amount using the linear function.

16. The system of claim 14, wherein the motion capture system comprises a lookup table associating bend amounts with indications of amounts of light received by the light detector, and the motion capture system looks up the indication of the amount of light received by the motion capture system in the lookup table to identify the bend amount associated with the indication of the amount of light received by the light detector encoded in the signal.

17. The system of claim 14, wherein the signal transmitted by the light detector is an analog signal, and the system further comprises a circuit configured to amplify the analog signal before the signal is transmitted to the motion capture system.

18. The system of claim 14, wherein the signal transmitted by the light detector is an analog signal, and the system further comprises an analog to digital converted configured to convert the analog signal into a digital signal before the signal is transmitted to the motion capture system.

19. A glove for use with a hand comprising a plurality of joints, the glove comprising:

a bend sensor for each of the plurality of joints, each bend sensor being positionable adjacent a selected one of the joints and configured to transmit a signal indicating by how much the selected one of the joints is bent, each bend sensor comprising:

a spring coiled about an interior channel, the spring being configured to bend when the selected one of the joints is bent;

a light emitter positioned to emit light into the interior channel of the spring, at least a portion of the light being reflected by the spring into the interior channel when the spring is bent; and a light detector positioned to receive light from the interior channel of the spring, an amount of light received by the light detector varying depending at least in part on an amount by which the spring has been bent, and the light detector being further configured to transmit a signal indicating the amount of light received by the light detector.

20. The glove of claim 19, further comprising an outer surface, wherein the bend sensors are coupled to the outer surface of the glove by one or more outer coverings.

21. The glove of claim 19, wherein the one or more outer coverings are opaque.

22. The glove of claim 19, wherein the spring further comprises a first end portion coupled to the glove to one side of the selected one of the joints, a second end portion coupled to the glove to an opposite side of the selected one of the joints, and a bendable intermediate portion between the first and second end portions, the bendable intermediate portion being configured to bend when the selected one of the joints is bent.

23. The glove of claim 19, further comprising:

a circuit corresponding to each of the bend sensors coupled to the glove, each of the circuits being configured to receive and amplify the signal transmitted by the light detector of the bend sensor corresponding to the circuit.

24. The glove of claim 19, further comprising:

a circuit corresponding to each of the bend sensors coupled to the glove, each of the circuits being configured to receive and digitize the signal transmitted by the light detector of the bend sensor corresponding to the circuit.

\* \* \* \* \*